United States Patent

Rumsey

[11] 4,214,604
[45] Jul. 29, 1980

[54] STRAIGHT THROUGH FLOW DIAPHRAGM VALVE STRUCTURES

[76] Inventor: Rollin D. Rumsey, 148 Summer St., Buffalo, N.Y. 14222

[21] Appl. No.: 875,744

[22] Filed: Feb. 6, 1978

[51] Int. Cl.² .............................................. F16K 7/00
[52] U.S. Cl. ..................................... 137/375; 251/331
[58] Field of Search ......................... 251/331; 137/375

[56] References Cited

U.S. PATENT DOCUMENTS

| | | | |
|---|---|---|---|
| 1,992,043 | 2/1935 | Saunders | 251/331 X |
| 2,684,829 | 7/1954 | McFarland, Jr. | 251/331 |
| 2,880,961 | 4/1959 | Wynn | 251/331 X |
| 2,947,325 | 8/1960 | McFarland, Jr. | 251/331 |
| 2,988,322 | 6/1961 | Anderson | 251/331 |
| 3,130,954 | 4/1964 | McFarland, Jr. | 251/331 |
| 3,134,571 | 5/1964 | Boteler | 251/331 |
| 3,298,660 | 1/1967 | Price et al. | 251/331 |
| 3,374,522 | 3/1968 | Boteler | 251/331 X |
| 3,407,838 | 10/1968 | Boteler | 251/331 X |
| 3,426,999 | 2/1969 | Toinet | 251/331 |
| 3,623,700 | 11/1971 | Boteler | 251/331 |

FOREIGN PATENT DOCUMENTS

| | | | |
|---|---|---|---|
| 269279 | 10/1950 | France | 251/331 |
| 539053 | 2/1956 | Italy | 251/331 |
| 898049 | 6/1962 | United Kingdom | 251/331 |

*Primary Examiner*—Arnold Rosenthal
*Attorney, Agent, or Firm*—Hill, Van Santen, Steadman, Chiara & Simpson

[57] ABSTRACT

A straight through flow diaphragm valve of the type in which a flow controlling diaphragm is operated by an actuating device for moving the diaphragm between fully opened and fully closed positions in respect to a flow passage through a valve body which is adapted to be installed in a fluent material carrying line, the flow passage geometry being so related to a shut-off ridge cooperatively related to the diaphragm across the passage so that the passage provides a substantially undiminished straight through flow path along the axis of the passage when the diaphragm is in the fully open position. An especially durable diaphragm structure is provided. The diaphragm is retained in a manner to prevent leakage where the valve must operate at elevated temperatures.

12 Claims, 8 Drawing Figures

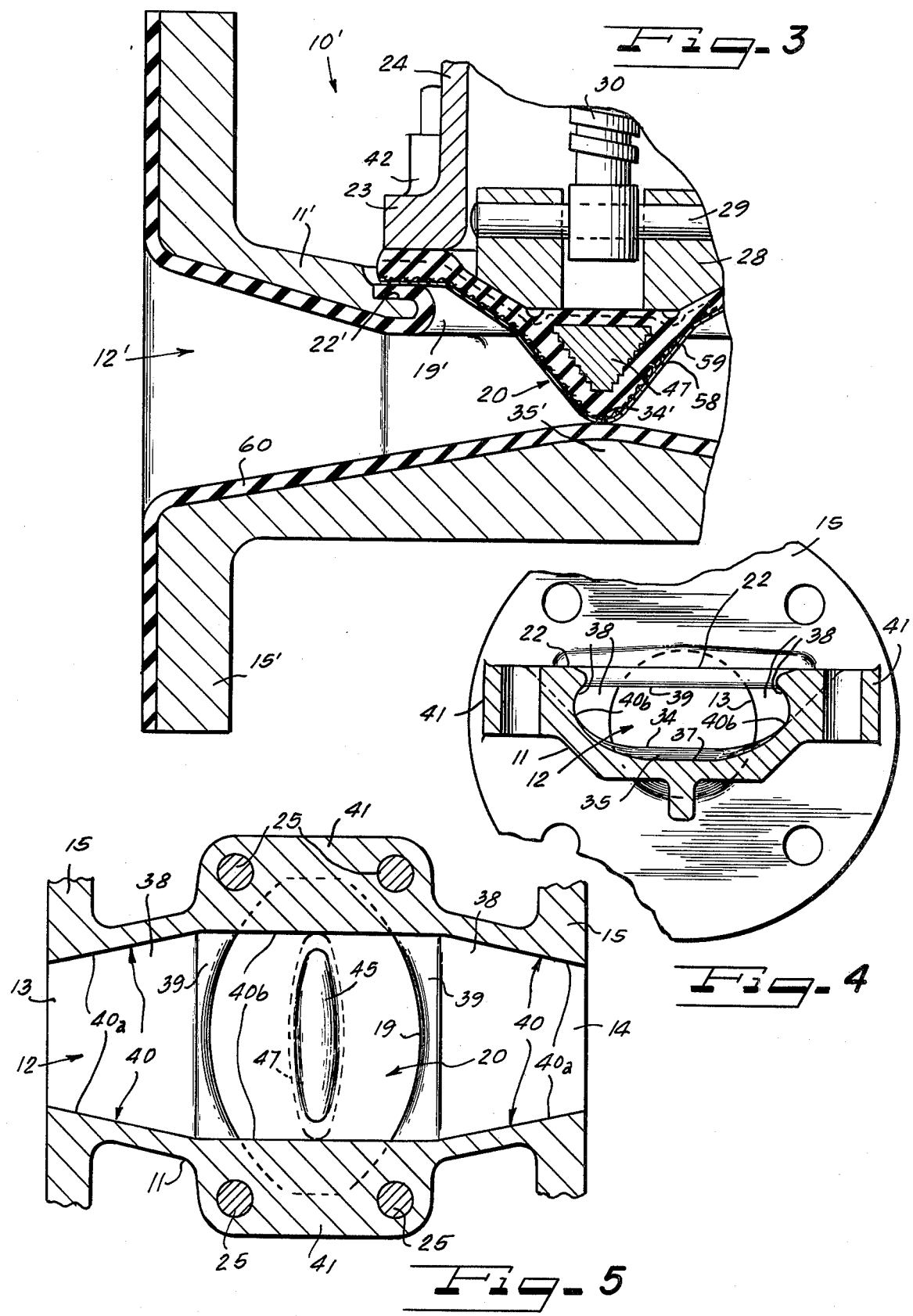

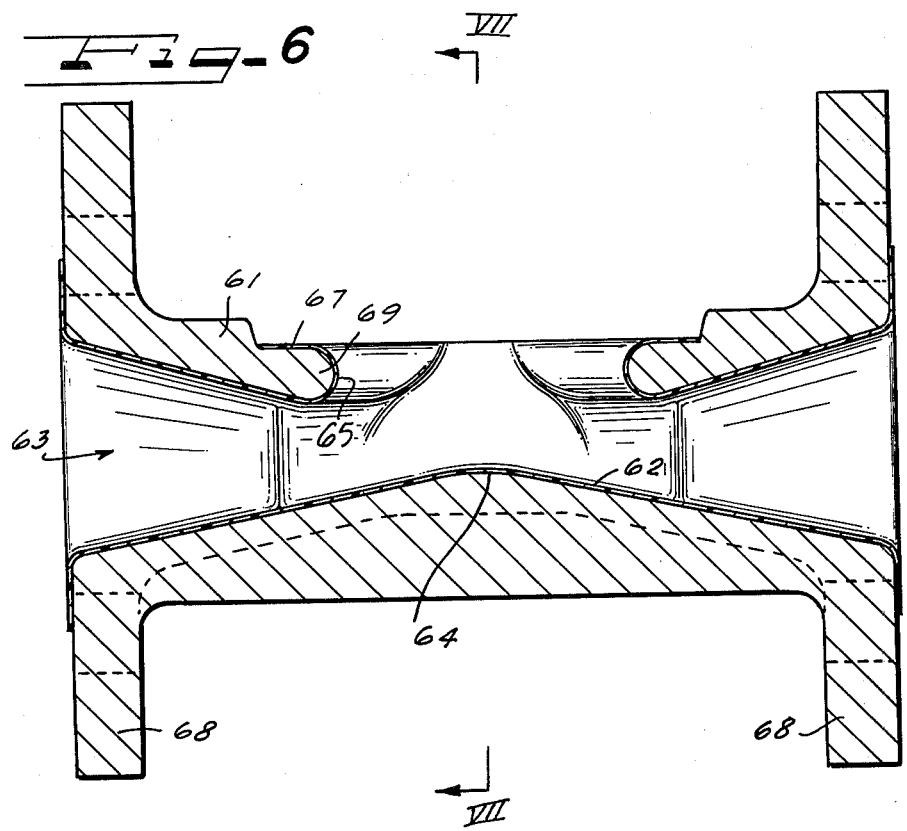
Fig-6
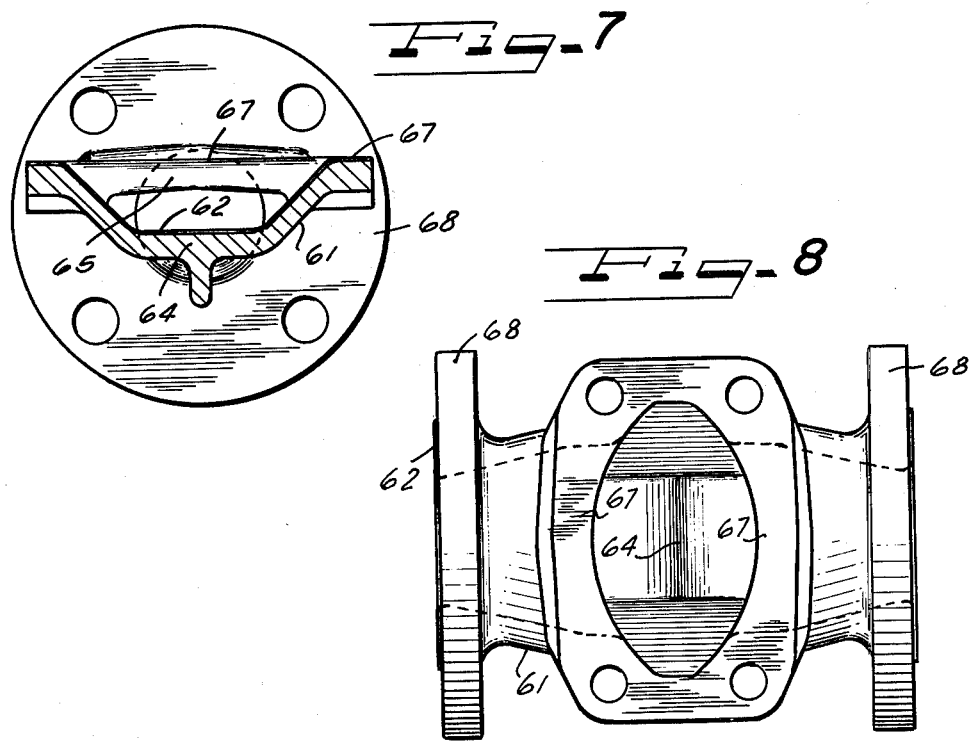
Fig-7
Fig-8

STRAIGHT THROUGH FLOW DIAPHRAGM VALVE STRUCTURES

The present invention relates to straight through flow diaphragm valve structures, and is more particularly concerned with the type of valve in which a flow controlling diaphragm is operated by means including an actuating device for moving the diaphragm throughout a range from fully open to fully closed positions in respect to a flow passage through a valve body which is constructed and arranged to be installed in a fluent material carrying line or pipe.

Valves of the kind indicated are especially useful in the food and beverage processing industries, pharmaceutical labratories, chemical plants, and the like, and are sometimes referred to as sanitary valves. Valves of this kind have also been useful in other industries such as for handling acid treated and other slurries in mineral extraction.

An early example of such valves is found in U.S. Pat. No. 1,992,043 in which the valve body passage has a high transverse weir with which the diaphragm is cooperable in controlling flow through the valve. A disadvantage of the high weir arrangement is that on passing the weir the flowing material is diverted toward and is caused to impinge the diaphragm. Excessive wear of the diaphragm causing short life is therefore experienced, especially with corrosive and abrasive materials.

An improved version of the valve is noted in U.S. Pat. No. 2,880,961 in which straight through flow is attained by complete elimination of the weir, and the diaphragm is so withdrawn when the valve is fully open as to substantially avoid impingement wear in use. However, valves embodying the structure of this patent have certain shortcomings. For example, the geometry of the passageway through the valve body is designed to mount the diaphragm close to the straight bottom wall so as to avoid excessive stretching of the diaphragm when the diaphragm is actuated to the valve closing position. This located the top wall on which the diaphragm was mounted along the axis of the ends of the flow passage and imposed an undesirable restriction upon the flow volume capacity of the valve. Further, polishing of the thus restricted flow passage in the valve body was complicated by the requirement to use relatively small diameter polishing wheels having short service life.

Some difficulty has also been experienced with prior diaphragm constructions and the means for securing the diaphragms in the valve assembly, especially where the valves are temperature cycled. Leakage has sometimes been experienced because the diaphragm tended to expand in thickness considerably more than the clamping parts expanded when heated, with the result that the diaphragm, especially when made from certain desirable materials, tended to extrude from the gap area between the clamping parts and when the valve cooled the diaphragm material was unable to flow back into the gap so that bolt preload on the diaphragm was reduced and leakage occured. Such leakage has been experienced especially where it is necessary to accommodate temperature differences on the order of 200° F. or more.

An important object of the present invention is to provide new and improved diaphragm valve structures of the kind under consideration, which will overcome the disadvantages, drawbacks, inefficiencies, shortcomings and problems inherent in the prior structures.

Another object of the invention is to provide new and improved diaphragm valve structures having especially efficient flow passage geometry.

A further object of the invention is to provide new and improved diaphragm valve structures in which the diaphragm is so constructed and arranged and the supporting structure is such that leakage is substantially precluded where the valve must operate at elevated temperatures.

Still another object of the invention is to provide a new and improved diaphragm construction for the valves.

According to features of the invention there is provided a diaphragm valve including a body having a passage therethrough provided with substantially coaxial opposite ends of substantial diameter and means on said body at said opposite ends of the passage for securing the body in a fluent material line to be controlled by the valve, an opening intermediately in said body into the top of said passage, a passage-controlling diaphragm extending across said opening and having a marginal attachment flange, an actuator bonnet secured over said opening and securing said diaphragm flange sealingly in place about said opening, and actuator means carried by said bonnet for operating said diaphragm between a retracted fully open position permitting substantially free flow of fluent material through said passage and a fully closed flow-stopping position in substantially sealing engagement with a closing off surface extending across said passage below said opening, the improvement comprising said closing off surface comprising a crest on a transverse ridge substantially below the longitudinal axis of the passage and underlying the diaphragm for flow stopping engagement by the diaphragm when driven against the crest by said actuating means, a bottom surface in said passage sloping upwardly from said opposite ends of said passage to said crest, top surface areas defining said passage sloping inwardly and downwardly from said opposite ends toward said opening the inner ends of said areas terminating substantially above said longitudinal axis, and respective side surfaces defining the sides of said passage, each side surface having areas diverging from said opposite ends of said passage and joining a respective substantial length longitudinally extending side surface portion of the associated side surface adjacent to said opening, said side surface portions being spaced apart substantially farther than said passage end diameters, said side surfaces merging smoothly with said top and bottom surfaces and the spacing of said side surface portions providing increased width for the passage adjacent to said ridge, whereby the range of control movement of the diaphragm between said fully open and said fully closed positions is minimized by said ridge, but the increased width of the passage adjacent to said ridge compensates for the vertical diminution of said passage by said ridge so that said passage provides a substantially undiminished straight through flow path along said axis when said diaphragm is in said fully open position.

According to other features of the invention there is provided a valve flow controlling diaphragm comprising an elastomeric body having an attachment flange of substantial width thereabout adapted to be clamped sealingly about a diaphragm opening in a valve body structure, said diaphragm body and flange having a flow controlling front face adapted to face through said diaphragm opening, and a back surface for engagement with an actuator outside of said diaphragm opening, means on said back surface for securing said diaphragm body to said actuator, said front face being engageable in flow stopping relation with a surface in a passage through said valve body structure by actuation of the valve by said actuator, a flexible protective surface material on said front face, and a flexible reinforcing screen layer bonded to said front face and to said flexible protective surface material.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure and in which:

FIG. 3 is a fragmental sectional detail view similar to FIG. 1 but showing a modification.

FIG. 4 is a sectional detail view taken substantially along the line IV—IV of FIG. 1.

FIG. 5 is a horizontal sectional detail view taken substantially along the line V—V of FIG. 1.

FIG. 6 is a longitudinal vertical sectional detail view of a valve body showing another modification.

FIG. 7 is a sectional elevational detail view taken substantially along the line VII—VII of FIG. 6;

FIG. 8 is a reduced top plan view of the structure in FIG. 6.

Figure 1:
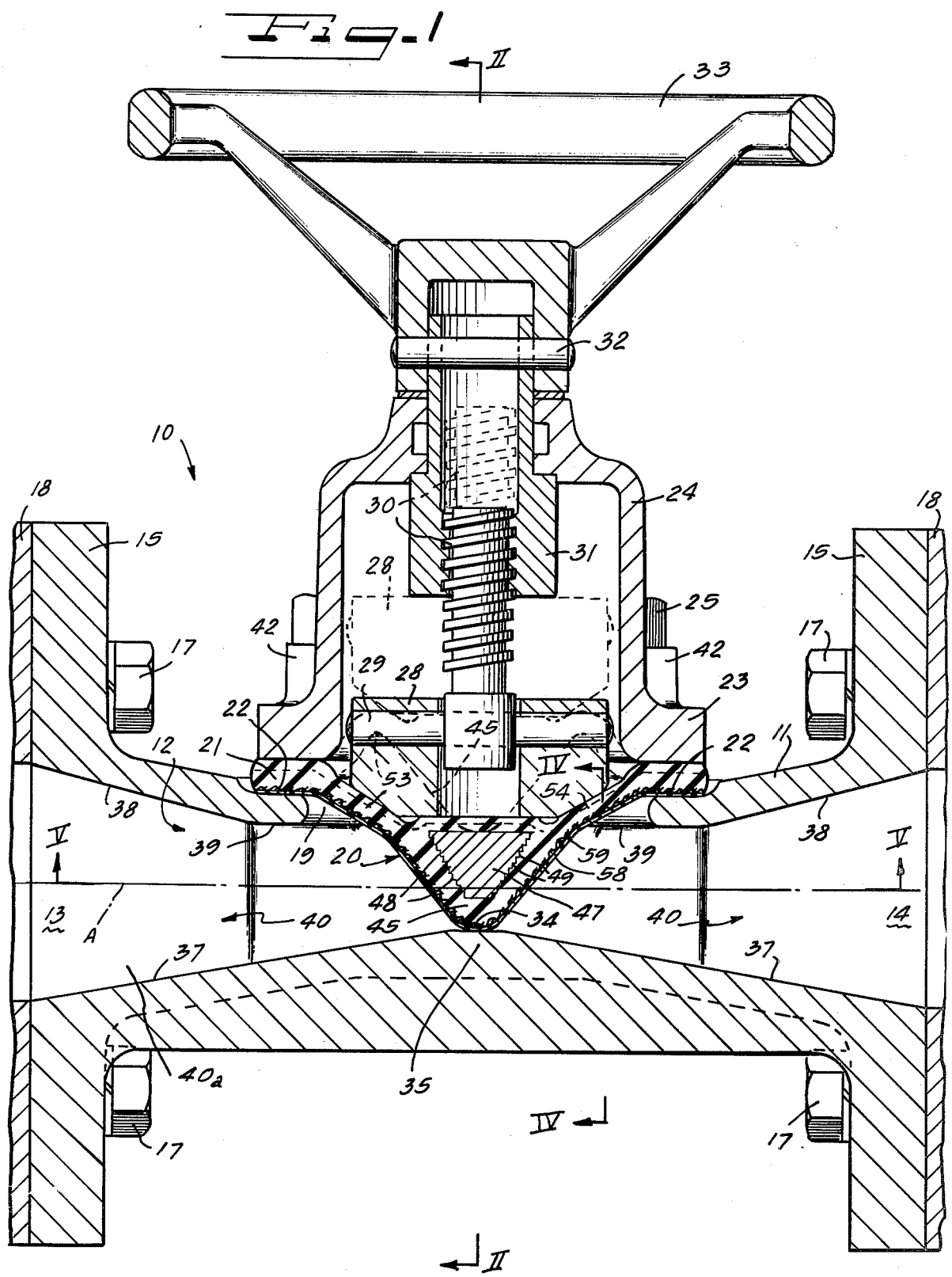
FIG. 1 is a vertical sectional view of a valve structure embodying features of the invention and taken substantially along the line I—I of FIG. 2.
Figure 2:
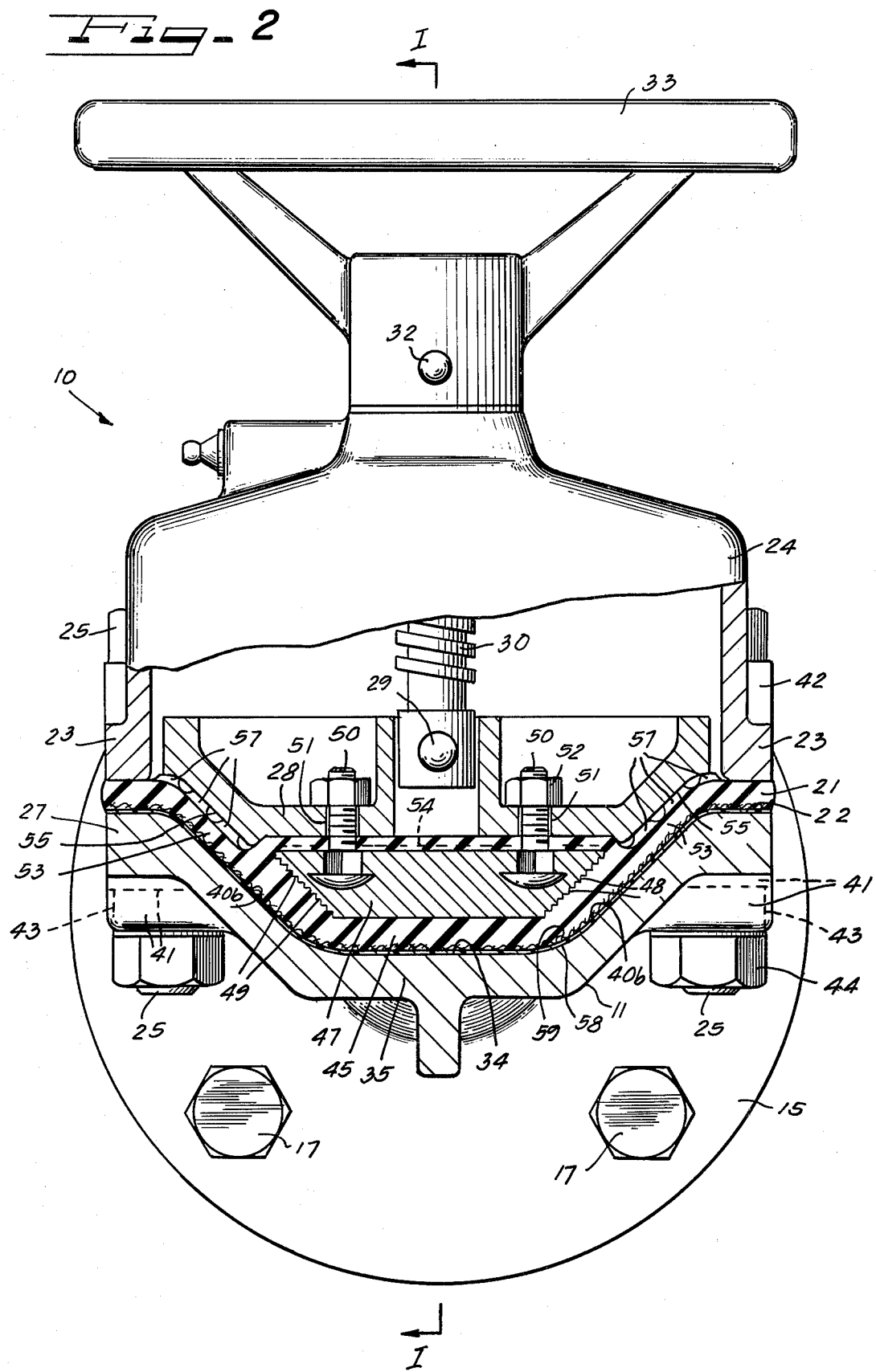
FIG. 2 is a sectional elevational view taken substantially along the line II—II of FIG. 1.

On reference to FIGS. 1 and 2 a diaphragm valve 10 embodying features of the invention includes a body 11 having a passage 12 therethrough provided with substantially coaxial opposite ends 13 and 14, respectively, of substantial diameter. The body 11 may be constructed from any suitable material such as cast iron or cast stainless steel depending upon the use for which the valve may be intended. A satisfactory manufacturing technique for producing the valve body 11 is investment casting. Means at the opposite ends 13 and 14 of the passage 12 for securing the body to a fluent material line to be controlled by the valve may comprise respective lateral annular attachment flanges 15 adapted to be secured as by means of bolts 17 to a matching attachment flange 18, in each instance, on the ends of respective pipe or other fluent material conducting means in alignment with which the valve body 10 is to be attached. Any other desirable means for securing the body 11 in a fluent material line may be used instead of the flanges 15, if desired.

A diaphragm accommodating opening 19 is provided intermediately in the body 11 into the top of the passage 12. A passage-controlling diaphragm 20 extends across the opening 19 and has a marginal attachment flange 21 entirely thereabout and secured to an upwardly facing seat 22 about the opening 19 on top of the valve body 11 by means of an attachment flange 23 about the lower end of an actuator bonnet 24 which is secured over the opening 19 as by means of bolts 25 which extend through the flange 23 and bolt flanges 27 on the body 11 and clamp the diaphragm flange 21 sealingly between the seat 22 and the bonnet flange 23. Diaphragm actuator means are carried by the bonnet 24 comprising, as shown, a manually operated device, but which, may if preferred, comprise a power operated device of suitable pressure fluid motivated, electromechanically motivated, or the like type as selected. In the illustrated example, a manually operated actuator is depicted, comprising a plunger 28 coupled as by means of a cross pin 29 to an upstanding drive screw 30 engaged by a complementary internally threaded drive sleeve 31 rotatably mounted in the top of the bonnet 24 and having an upwardly projecting portion coupled as by means of a pin 32 to the hub of a hand wheel 33 which is adapted to be manipulated to motivate the diaphragm actuator for operating the diaphragm 20 between a retracted fully open position substantially above axis of alignment A of the passage ends 13 and 14, as shown in dash outline in FIG. 1, and a fully closed flow stopping position in substantially sealing engagement with a surface 34 extending across the passage 12 below the opening 19, as shown in full outline.

According to the present invention, the closing off surface 34 comprises a crest on a transverse ridge 35 located substantially below the longitudinal axis A of the passage 12 and underlying the diaphragm 20 for flow stopping engagement by the diaphragm when driven against the crest 34.

Especially efficient flow passage geometry is attained, as well as other advantages, by having respective bottom surfaces 37 defining the passageway for passage 12 sloping upwardly from the opposite ends 13 and 14 to the crest 34. At the top of the passage 12 respective top surface areas 38 are provided which slope inwardly and downwardly from the opposite ends 13 and 14 generally toward the opening 19, with the inner ends of the areas 38 terminating substantially above the longitudinal axis A at a substantially flat area 39 underlying the diaphragm attachment flange seat 22. As will be observed the passage roof area 39 is desirably at least as high above the axis A as the crest 34 is below the axis A, and preferably slightly higher.

Respective opposite side surfaces 40 (FIGS. 1 and 5) define the opposite sides of the passage 12. Each of the side surfaces 40 has areas 40a which diverge from the opposite ends 13 and 14 of the passage 12 and join a substantial length longitudinally extending side surface portion 40b of the side surface 40 adjacent to the opening 19. As will be observed, the side surface portions 40b are spaced apart substantially farther than the diameters of the passage ends 13 and 14. As visualized at least to some extent in FIG. 4, the side surfaces 40 merge smoothly with the top and bottom surfaces 37 and 38, and the spacing of the side surface portions provide increased width of the passage 12 adjacent to the ridge 35.

It will thus be apparent that the range of control movement of the diaphragm 20 between the fully open and fully closed positions is minimized by the ridge 35, but the increased width of the passage 12 adjacent to the ridge compensates for the vertical diminution of the passage 12 by the ridge so that the passage 12 provides a substantially undiminished volume straight through flow path along the axis A when the diaphragm 20 is in the fully open position. By "substantially undiminished volume" is meant that the cross-sectional volume capacity of the passage 12 from end to end is within a range of no less than approximately 80% of the capacity of the ends 13 and 14. This is accomplished by the geometry of the present construction while maintaining the distance the diaphragm 20 must travel between fully open and fully closed positions within a safe range having regard to the most desirable construction and configuration of the diaphragm.

Another desirable attribute of the described structural relationships within the passage 12 is that polishing of the passageway walls is greatly facilitated. For example, in a valve of 2-inch size embodying prior structure such, for example, as that disclosed in U.S. Pat. No. 2,880,961 the maximum diameter of polishing wheel permitted was ⅝ inch. The more open and more accessible passageway attained in the present structure permits the use of a 1⅛ inch diameter polishing wheel in a 2-inch valve. This results in at least double the polishing wheel life and faster polishing to name only two advantages. An important feature to the attainment of this improved result resides in the open relationship of the roof surface area 39 to the bottom surfaces 37. By having the distance between the surfaces 39 and 37 at least 1⅛ inch at their closest approach, permits a 1⅛ inch diameter polishing wheel to be used anywhere within the passage 38, because inwardly from the surface area 39 the opening 19 affords complete clearance even for polishing the rib 35 and more particularly the crest 34. It may be pointed out that where the 1⅛ inch clearance is suitable for the passage 12 in a valve in which the body 11 is about 7½ inches long and the diameter of the passage ends 13 and 14 is about 2 inches, the bottom surfaces 37 may converge toward the axis A at about 8 to 11 degrees, the top surface areas 38 may converge toward the axis A at about 14 to 19 degrees, and the side surface areas 40a may diverge relatively to the axis A at 9 to 15 degrees, the space between the surfaces 40b being about 3 inches. An unexpected result of the described improvements in the structure as compared to a valve of substantially the same size constructed according to the disclosure in U.S. Pat. No. 2,880,961 has been a great improvement in flow rate through the passage 12. Although the cross-sectional flow area through the passage 12 in the vicinity of the opening 19 and the diaphragm 20 may be enlarged only about 25% as compared to the equivalent area in the prior valve structure, it has been found that the flow rate in the present valve structure has substantially doubled as compared to the prior valve structure.

In the prior valve structures a problem has been that where the diaphragm valves are temperature cycled such as may encounter temperature differences on the order of 200° F. or more, particularly with tetrafluoroethylene faced diaphragms, leakage sometimes develops because the diaphragm may expand in thickness considerably more than the space between the clamping surfaces on the valve body and the bonnet enlarges as a result of the increased temperatures. As a result the clamped flange of the diaphragm tends to extrude from the gap between the clamping surfaces and when the valve cools the flange is unable to flow back into the gap. Therefore the bolt preload on the diaphragm flange is reduced and leakage occurs. According to the present invention this problem is solved by so constructing the clamping structures and the securing bolts and the diaphragm attachment flange that a coordinated coefficient of thermal expansion is attained. By way of example, where both the valve body 11 and the bonnet 24 are made from cast iron, the thickness of bolt lugs 41 (FIG. 2) on the valve body 11 and the thickness of bolt lugs 42 on the bonnet 24 may be substantially equal, e.g., 1 inch. For this, the bolts 25 are desirably about 2¼ inch long and made from stainless steel, type 304 being preferred as having a compatible expansion rate. The molded thickness of the diaphragm flange 21 is desirably ¼ inch, and the bolted clamped tightening of the flange 21 is effective to reduce the flange thickness to about 0.2 inch. By way of example, where the expansion rate at 200° F. of the cast iron lugs 41 and 42 is $5.56 \times 10^6$ in./in./°F.=0.0022 inch and that of the bolts 25 is 0.0046 inch, the clamping surfaces between which the diaphragm flange 21 is engaged may be expected to open up about 0.0024 inch. At the same time, the diaphragm flange 21 with a coefficient of $43 \times 10^6$ will expand 0.0021 inch. Therefore, at the 200° F. temperature, the gap between the seating surface 22 and the opposed clamping surface of the flange 23 opens at substantially the same rate as the diaphragm flange 21 thickens or expands and the bolting load or squeeze on the flange 21 will remain substantially constant. As a result, extrusion of the diaphragm flange 21 will be prevented and leakage will be avoided.

If, because of the use to which the valve is to be put, the valve body 11 must be constructed of stainless steel, the body bolt lugs 41 may be constructed as thin as possible as indicated in dash outline in FIG. 2. The stainless bolts 25 may remain of substantially the same length as though the bolt lugs 41 were on a cast iron body, and to compensate steel spacers 43 of appropriate length interposed between nuts 44 of the bolts 25 and the shortened bolt lugs 41. Thereby, the complementary coefficient of expansion relationship is substantially preserved to attain the desirable result of avoiding heat expansion extrusion of the clamped diaphragm flange.

Substantial improvements are embodied in the diaphragm 20 as compared with prior structures as represented in the U.S. Patents referred to hereinbefore. To this end, the diaphragm 20 is molded from a suitable elastomer selected for the anticipated operating temperatures of the fluent material to be handled by the valve assembly. Relatively low temperatures can be handled by natural rubber. Higher temperatures can be handled by neoprene, chlorobutyl, ethylene propylene, and the like. Whatever the elastomeric material selected, the diaphragm 20 comprises a rib-like elastomeric body 45 of generally triangular cross-section providing an apex projecting from the front face of the diaphragm, that is the face which is at the inner side of the diaphragm as mounted in the valve assembly. As seen in FIGS. 1 and 2, the diaphragm body 45 is so shaped and oriented with respect to the shut off crest 34 of the rib 35 and the divergently sloping side portions 40b extending from the opposite ends of the rib crest 34 that in the closed valve position, the diaphragm body 45 effects a fully sealing engagement with the shut-off surface crest 34 and the adjacent areas of the divergently sloping side wall portions 40b.

In order to enhance the sealing pressure that can be applied to the diaphragm body 45 by the actuator plunger 28 and also to secure the diaphragm 20 to the actuator plunger in a manner to enable retracting the diaphragm 20 from the sealing or valve shut off position to the valve open position, a preferably metal insert 47 of complementary shape but smaller size is molded in the diaphragm body 45. Adhesion of the molded elastomer to the insert 47 is substantially improved by increasing the surface area of the insert as by casting the insert with a stepped pattern of ribs 48 and alternating shallow recesses 49 and wherein the ribs and recesses present surfaces directed generally toward the apex of the diaphragm body 45 for maximum pressure application advantage when the diaphragm is driven into flow stopping engagement with the crest 34 and the adjacent areas of the side wall portions 40b. For securing the diaphragm by means of the insert 47 to the actuator plunger 38, carriage bolts 50 having their heads cast in place in the insert 47 project from the back surface of the diaphragm 20 and extend through suitable holes 51 in the plunger 28. By means of nuts 52 on the bolts 50 the diaphragm can thus be detachably secured in place on the engaged face of the plunger 28. Instead of the fasteners 50 as shown, a suitably dimensioned U-bolt having shanks equivalent to the shanks of the carriage bolts may be incorporated with the insert casting. Alternatively the insert 47 may be provided with tapped holes so that screws may be inserted through the plunger holes 51 into the tapped holes in the insert for securing the diaphragm 20 to the plunger 28.

When the diaphragm 20 is retracted toward the open valve position (dash outline FIG. 1) a substantial area 53 of the diaphragm intervening between the body 45 and the thicker clamping margin 21 of the flange is subjected to substantial flexing. Therefore, the intervening flange area 53 is desirably made in a substantially thinner section than the clamping margin whereby to afford easier bending and longer flex life. Reinforcement which may comprise a nylon fabric 54 is molded into the back portion of the diaphragm 20 extends continuously throughout at least the back portion of the rib 45 and those portions of the flange 21 along the length of the rib. Thus not only the flexing area 53, but also the back of the rib along the insert 47 is desirably reinforced.

Although as will be appreciated from FIG. 2, the insert 45 by its complementary shape along its edge to the shut off surface rib crest 34 and the adjacent areas of the side wall portions 40b will thoroughly press the intervening portion of the diaphragm body 45 against the crest 34 and the side wall portions 40b, pressure surfaces 55 on the plunger 28 are relied upon to press the diaphragm flange 21 beyond the diaphragm body 45 against the side wall portions 40b. However, in order to assure thorough sealing in spite of variations in casting surfaces and contour where the diaphragm engages the side wall portions 40b maximum available thickness in the diaphragm flange is desirable between the pressure surfaces 55 and the side wall surfaces 40b. In order to gain the advantages of enhanced flexibility, while nevertheless attaining excellent sealing compression by action of the pressure surfaces 55 the faces of the thinner section flange areas 53 which oppose the pressure surfaces 55 are provided with an array of fairly closely spaced and substantial mass projections 57 of the elastomeric material of the diaphragm 20 molded integrally with the diaphragm portions 53, in line with the sealing surface apex of the diaphragm body 45. As a result, the enhanced flexibility of the diaphragm flange areas 53 is preserved while nevertheless in the critical sealing off zone thorough sealing pressure is applied in the valve closing position of the diaphragm by the pressure surfaces 55 acting through the projections 57 against the diaphragm flange areas 53 in cooperation with the pressure applied by the plunger 28 against the diaphragm body 45.

For at least some important uses in the valve 10, it may be desirable to provide the diaphragm 20 with a protective surface material 58 on the front of the body 45 and the flange 21, that is the face which is exposed to or faces toward the passage 12. By way of example, polytetrafluoroethylene may serve as such a protective surface material, bonded in a thin layer to the surface of the diaphragm. Advantageously a polyester reinforcing screen mesh 59 is in intimate contact with the protective layer 58 and is integrally molded into the principle elastomeric material of the diaphragm 20. This construction minimizes and limits any tendency toward cold flow in the flexible protective surface material 58 and prevents thinning on the sealing surfaces of the diaphragm which contact the metal surfaces of the valve body in the passage 12 in the closed valve condition. Further, the reinforcing mesh 59 overcomes cracking of the flexible protective surface material 58 in the areas where maximum flexing takes place along the flange areas 53 because the reinforcing mesh transfers expansion and contraction stresses during bending into the principal elastomer portion of the diaphragm 20 and relieves the flexible protective surface material from such stresses.

For some uses it may be desirable to provide the valve 10' (FIG. 3) with a rubber lining 60 throughout the passage 12. Such a lining may be especially useful where fluent material damaging to metal parts may have to be handled. By rubber is meant any elastomer suitable for the particular purpose intended. In order to maintain the geometric relationships within the passage 12' substantially as described hereinbefore, the surfaces within the valve body 11' may be formed with adequate clearance to compensate for the thickness of the rubber lining. For maximum protection, the rubber lining 60 is carried over onto the clamping surface 22' and is also continued onto the outer faces of the end attachment flanges 15', where such flanges are employed on the valve body. Other features of the valve 10' may be identical with the valve 10 already described, including the diaphragm 20 and the actuator mechanism including the bonnet 24 and the presser plunger 28.

Having regard to FIGS. 6, 7 and 8, a valve body 61 is shown which in essential respects is the same as the valve body 11 except that a slight modification has been made to accommodate glass lining 62 for the surfaces exposed within and adjacent to a passage 63 through the valve body and of substantially the same construction as the passage 12 in the valve body 11. As will be observed, the glass lining 62 covers not only all of the convergent and divergent surfaces within the passage 63 including a shut-off surface ridge 64 comperable to the ridge 35, but also the edges defining a control diaphragm opening 65 comperable to the diaphragm opening 19 as well as a valve clamping seating surface 67 comperable to the surface 22 in FIGS. 1 and 2. Desirably the glass lining 62 is continuous onto the outer faces of attachment flanges 68. In order to facilitate applying and maintaining the glass lining 62 on the edges of flanges 69 about the opening 65, a somewhat larger radius is provided in the flange edge as compared to the radius of corresponding opening defining flange edge in FIG. 1. This restricts the flow passage 63 slightly, but for those uses for which a glass lined valve is desirable is a tolerable consideration having regard to the advantages accruing from the glass lining.

An important advantage accruing from the straight through flow passage geometry according to the present invention, is that the valve body 11,11' or 61, as the case may be, is adapted to be cast using a single, that is a common pattern, but employing respectively different cores to accomplish the desired variations within the flow passages. That is, a core for the rubber lined valve passage 12' in FIG. 3 will provide for the necessary clearance in the finished casting to accommodate the rubber lining 60 as compared to the core which will produce the flow passage configuration in FIG. 1. Also appropriate modification in the core in casting the modification of FIGS. 6–8 will provide the desired difference in the flange 69 configuration as compared to FIG. 1. This capability of employing a single pattern with different cores effects substantial savings in producing castings for any particular valve size such, for example, as the 2 inch passage size exemplified in the present disclosure.

It will be understood that variations and modifications may be effected without departing from the spirit and scope of the novel concepts of this invention.

I claim as my invention:

1. A diaphragm valve including a body having a passage therethrough provided with substantially coaxial opposite ends of substantial diameter and means on said body at said opposite ends of the passage for securing the body in a fluent material line to be controlled by the valve, an opening intermediately in said body into the top of said passage, a passage-controlling diaphragm extending across said opening and having a marginal attachment flange, an actuator bonnet secured over said opening and securing said diaphragm flange sealingly in place on an upwardly facing surface extending about said opening, and actuator means carried by said bonnet for operating said diaphragm between retracted fully open position permitting substantially free flow of fluent material through said passage and a fully closed flow-stopping position in substantially sealing engagement with a closing off surface extending across said passage below said opening, the improvement comprising:

said closing off surface comprising a crest on a transverse ridge adjacent the longitudinal axis of the passage and underlying the diaphragm for flow stopping engagement by the diaphragm when driven against the crest by said actuating means;

a bottom surface in said passage sloping upwardly from said opposite ends of the passage to said crest;

top surface areas defining said passage sloping inwardly and downwardly from said opposite ends toward said opening and inner ends of said areas terminating substantially above said longitudinal axis;

and respective side surfaces defining the sides of said passage, each side surface having areas diverging from said opposite ends of the passage and joining a respective substantial length longitudinally extending generally straight side surface portion of the associated side surface adjacent to said opening, said side surface portions being spaced apart substantially farther than said passage end diameters and having respective intermediate oblique surface areas extending divergently upwardly from the opposite ends of said crest to said upwardly facing surface and providing parts of said closing off surface and adapted to cooperate with said crest for passage-sealing engagement by said diaphragm in its fully closed position;

said side surfaces merging smoothly with said top and bottom surfaces and the spacing of said side surface portions providing increased width for the passage adjacent to said ridge;

whereby the range of control movement of the diaphragm between said fully open and said fully closed positions is minimized by said ridge, but the increased width of the passage adjacent to said ridge compensates for the vertical diminution of said passage by said ridge so that said passage provides a straight through flow path of substantially undiminished cross sectional flow area along said axis when said diaphragm is in said fully open position.

2. A diaphragm valve according to claim 1, wherein said passage ends are about 2 inches in diameter, and said inner ends of said top surface areas are spaced above said bottom surface a sufficient distance to accommodate a 1¼ inch polishing wheel for polishing the surfaces within the passage.

3. A diaphragm valve according to claim 1, wherein all of said surfaces within said passage, an edge defining said opening, and a surface about said opening onto which said diaphragm flange is clamped by said bonnet are covered by a continuous rubber lining.

4. A diaphragm valve according to claim 1, wherein all of said surfaces within said passage, an edge defining said opening, and a surface about said opening onto which said diaphragm flange is clamped by said bonnet are covered by a continuous glass lining.

5. A diaphragm valve according to claim 1, wherein said diaphragm comprises a rib-like elastomeric body of generally triangular cross-section having a flow controlling front face and a back surface for engagement with said actuator means, means securing said back surface to said actuator means, and a rib apex projecting from said front face of said elastomeric body for engagement in flow stopping engagement with said crest and said oblique surface areas.

6. A diaphragm valve according to claim 5, wherein said diaphragm elastomeric body has molded therein a rigid member, and elements carried by said rigid member and projecting from said back surface into retaining engagement with said actuator means.

7. A diaphragm valve according to claim 5, wherein said diaphragm elastomeric body has embedded therein a rigid member of generally triangular shape complementary to said elastomeric body, and stepped surfaces on said rigid member facing generally toward said rib apex for efficient pressure transfer from said actuator means through said rigid member toward said rib apex and also providing increased bonding area with the material of said elastomeric body.

8. A diaphragm valve including a body having a passage therethrough provided with substantially coaxial opposite ends of substantial diameter and means on said body at said opposite ends of the passage for securing the body in a fluent material line to be controlled by the valve, an opening intermediately in said body into the top of said passage, a passage-controlling diaphragm extending across said opening and having a marginal attachment flange, an actuator bonnet secured over said opening and securing said diaphragm flange sealingly in place about said opening, and actuator means carried by said bonnet for operating said diaphragm between a retracted fully open position permitting substantially free flow of fluent material through said passage and a fully closed flow-stopping position in substantially sealing engagement with a closing off surface extending across said passage below said opening, the improvement comprising:

said valve body and said bonnet having opposed clamping surfaces about said opening;

said marginal attachment flange having a margin of substantial thickness engaged clampingly between said clamping surfaces;

and means for securing said bonnet and said valve body together in assembly with said diaphragm margin clamped between said clamping surfaces;

said securing means having a coefficient of expansion substantially the same as the coefficient of expansion of said margin so that extrusion of said margin from between said clamping surfaces is substantially precluded and leakage past said margin avoid.

9. A diaphragm valve according to claim 8, wherein said securing means comprise bolt lug means of substantially the same width on said valve body and said bonnet, and bolts securing the bolt lug means in assembly, the material of said bolt lug means and said bolts being selected to have said substantially equal coefficient of expansion to said margin.

10. A valve flow controlling diaphragm, comprising:
an elastomeric diaphragm body having an attachment flange of substantial width thereabout adapted to be clamped sealingly about a diaphragm opening in a valve body structure;
said diaphragm body and flange having a flow controlling front face adapted to face through said diaphragm opening, and a back surface for engagement with an actuator outside of said diaphragm opening;
means on said back surface for securing said diaphragm body to said actuator;
said front face being engageable in flow stopping relation with a surface in a passage through said valve body structure by actuation of the diaphragm by said actuator;
a flexible protective surface material on said front face;
a flexible reinforcing screen layer molded into said front face and bonded to said flexible protective surface material;
and a reinforcing synthetic fabric embedded in said diaphragm body and in said attachment flange and spaced from said reinforcing screen layer.

11. A diaphragm valve including a body having a passage therethrough provided with substantially coaxial opposite ends of substantial diameter and means on said body at said opposite ends of the passage for securing the body in a fluent material line to be controlled by the valve, an opening intermediately in said body into the top of said passage, a passage-controlling diaphragm extending across said opening and having a marginal attachment flange, an actuator bonnet secured over said opening and securing said diaphragm flange sealingly in place about said opening, and actuator means carried by said bonnet for operating said diaphragm between a retracted fully open position permitting substantially free flow of fluent material through said passage and a fully closed flow-stopping position in substantially sealing engagement with a closing off surface extending across said passage below said opening, the improvement comprising:
said closing off surface comprising a crest on a transverse ridge adjacent the longitudinal axis of the passage and underlying the diaphragm for flow stopping engagement by the diaphragm when driven against the crest by said actuating means;
a bottom surface in said passage sloping upwardly from said opposite ends of the passage to said crest;
top surface areas defining said passage sloping inwardly and downwardly from said opposite ends toward said opening and inner ends of said areas terminating substantially above said longitudinal axis;
respective side surfaces defining the sides of said passage, each side surface having areas diverging from said opposite ends of the passage and joining a respective substantial length longitudinally extending side surface portion of the associated side surface adjacent to said opening, said side surface portions being spaced apart substantially farther than said passage end diameters;
said side surfaces merging smoothly with said top and bottom surfaces and the spacing of said side surface portions providing increased width for the passage adjacent to said ridge;
whereby the range of control movement of the diaphragm between said fully open and said fully closed positions is minimized by said ridge, but the increased width of the passage adjacent to said ridge compensates for the vertical diminution of said passage by said ridge so that said passage provides a substantially undiminished straight through flow path along said axis when said diaphragm is in said fully open position;
complementary clamping surfaces on said body and said bonnet between which a margin of said diaphragm is retainingly clamped;
and means for securing said body and bonnet goether in assembly providing a coefficient of expansion substantially equal to the coefficient of expansion of said diaphragm margin so that under heated conditions said clamping surfaces will expand substantially equal to expansion of said margin and extrusion of the margin from the space between said surfaces will be substantially precluded and leakage past said margin avoided.

12. A diaphragm valve including a body having a passage therethrough provided with substantially coaxial opposite ends of substantial diameter and means on said body at said opposite ends of the passage for securing the body in a fluent material line to be controlled by the valve, an opening intermediately in said body into the top of said passage, a passage-controlling diaphragm extending across said opening and having a marginal attachment flange, an actuator bonnet secured over said opening and securing said diaphragm flange sealingly in place about said opening, and actuator means carried by said bonnet for operating said diaphragm between a retracted fully open position permitting substantially free flow of fluent material through said passage and a fully closed flow-stopping position in substantially sealing engagement with a closing off surface extending across said passage below said opening, the improvement comprising:
said closing off surface comprising a crest on a transverse ridge adjacent the longitudinal axis of the passage and underlying the diaphragm for flow stopping engagement by the diaphragm when driven against the crest by said actuating means;
a bottom surface in said passage sloping upwardly from said opposite ends of the passage to said crest;
top surface areas defining said passage sloping inwardly and downwardly from said opposite ends toward said opening and inner ends of said areas terminating substantially above said longitudinal axis;
respective side surfaces defining the sides of said passage, each side surface having areas diverging from said opposite ends of the passage and joining a respective substantial length longitudinally extending side surface portion of the associated side surface adjacent to said opening, said side surface portions being spaced apart substantially farther than said passage end diameters;

said side surfaces merging smoothly with said top and bottom surfaces and the spacing of said side surface portions providing increased width for the passage adjacent to said ridge;

whereby the range of control movement of the diaphragm between said fully open and said fully closed positions is minimized by said ridge, but the increased width of the passage adjacent to said ridge compensates for the vertical diminution of said passage by said ridge so that said passage provides a substantially indiminished straight through flow path along said axis when said diaphragm is in said fully open position;

said diaphragm comprising a substantial mass body and said attachment flange comprising a margin of substantial thickness and engaged by the bonnet in securing the diaphragm flange sealingly in place about said opening;

a substantially thinner section area of the diaphragm flange intervening between said diaphragm body and said margin to facilitate flexing in movement of said body between the valve closed and open positions;

said actuator means including pressure surfaces opposing said thinner section area of the diaphragm;

and said thinner section area of the diaphragm having spaced projections therefrom engaging said pressure surfaces to facilitate adequate sealing pressure imposition by said pressure surfaces on said thinner section area toward the closing off surface in the closed position of the diaphragm but facilitating flexing of the reduced section area when the diaphragm is in movement between the open and closed positions.

* * * * *